United States Patent Office 3,525,709
Patented Aug. 25, 1970

3,525,709
MODIFIED POLYORGANOSILOXANES
Sheena Margaret Somerville, Camberley, and Ian Malcolm White, Farnborough, England, assignors to Minister of Technology in Her Britannic Majesty's Government of the United Kingdom of Great Britain and Northern Ireland, London, England
No Drawing. Continuation-in-part of application Ser. No. 532,118, Mar. 7, 1966. This application Feb. 2, 1968, Ser. No. 702,558
Claims priority, application Great Britain, Mar. 9, 1965, 9,889/65
Int. Cl. C08f *11/04*
U.S. Cl. 260—46.5      12 Claims

ABSTRACT OF THE DISCLOSURE

Silicone elastomers are obtained by cross-linking by conventional means modified polyorganosiloxane gums consisting essentially of polymeric chains of alternate Si and O atoms into which aromatic diester groups have been incorporated. For example 3-fluorodimethylsilyl-2,2-dimethylpropan-1-ol is reacted with isophthaloyl chloride to produce bis-(3-fluorodimethylsilyl-2,2-dimethylpropyl) isophthalate which is subjected to mildly alkaline hydrolysis to give the corresponding bis-(3-hydroxydimethylsilyl-2,2-dimethylpropyl) isophthalate which is carefully purified and then polymerized by heating in the presence of a conventional siloxane polycondensation catalyst. The elastomeric compositions have increased resistance to attack by solvents.

---

This application is a continuation-in-part of our copending application Ser. No. 532,118 filed on Mar. 7, 1966, now abandoned.

The present invention relates to polyorganosiloxane gums which are polymers having alternating silicon and oxygen atoms in the polymer chain and two monovalent organic groups attached to each of the silicon atoms, and is concerned with modified polyorganosiloxane gums which may be cross-linked by known methods to produce elastomeric materials.

Conventional silicone elastomers have good thermal stability, showing the widest service range of all elastomers and the best long-term retention of strength at high temperatures. Unfortunately, their strength at any temperature is not high and their resistance to solvents not good.

One object of the present invention is to provide modified polyorganosiloxane gums which may be cross-linked to produce elastomers having improved strength in which the advantageous properties of polyorganosiloxanes are not significantly diminished.

A further object is to provide polyorganosiloxane elastomers in which strong polymer/filler interaction may occur, raising further the strength of the elastomeric composition, and which have increased resistance to attack by solvents.

In accordance with the present invention there is provided a modified polyorganosiloxane gum consisting essentially of repeating units each represented by the formula:

(I)

in which $R_A$, $R_B$, $R_C$, and $R_D$ represent monovalent organic groups which may be lower alkyl, lower alkenyl or single ring aryl; $R^1$ represents an alkylene group which contains at least three carbon atoms in the alkylene chain; Py represents an arylene group; and $n$ may be any positive integer inclusive of 0.

In order to develop elastomeric properties the polyorganosiloxane gums of this invention should be cross-linked, but the mode of cross-linking does not constitute part of the invention and may be carried out by any of the conventional means known to the art, for example, by heating with organic peroxides or by irradiation. There is a degree of polymerisation below which a gum cannot be converted to an elastomer on cross-linking and polyorganosiloxane gums of the present invention generally have a degree of polymerisation greater than 20.

$R_A$, $R_B$, $R_C$, and $R_D$ represent predominantly lower alkyl groups, preferably methyl, although other groups may replace lower alkyl groups to confer advantageous properties upon the gums of the invention. For example, replacement by lower alkenyl groups, preferably vinyl, assists in the process whereby the polyorganosiloxane gum is cross-linked to produce an elastomer; and replacement by single ring aryl groups, preferably phenyl, confers increased stability against oxidative degradation. Advantageously vinyl groups may replace lower alkyl groups to an extent of up to 5 moles percent, preferably about 2 moles percent while phenyl groups may replace lower alkyl groups to the extent of up to 20 moles percent but preferably not more than 10 moles percent. The group $R^1$ may be an unsubstituted chain of at least three methylene groups but preferably the carbon atom in this group $\beta$ to the ester oxygen does not carry hydrogen. A preferred group is neopentylene. Py is preferably a meta-arylene or substituted meta-arylene group since the meta orientation causes a less adverse effect on the low temperature elastomeric properties of materials prepared from the resulting modified polyorganosiloxane gums than ortho- or para- orientation. However, where poorer low temperature elastomeric properties in these materials can be tolerated ortho- or para-arylene groups may be incorporated in order to obtain desired elastomeric or other properties.

Modified polyorganosiloxane gums in accordance with the invention may be prepared conveniently by a process in which a compound having the formula,

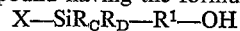

(in which X represents fluorine, and $R_C$, $R_D$, and $R^1$ are as hereinabefore defined), is reacted with a compound having the formula $Py(CO \cdot Z)_2$ in which Z represents halogen, preferably chlorine, and Py is as hereinbefore defined) in the presence of tertiary organic base to give a product having the formula:

(II)
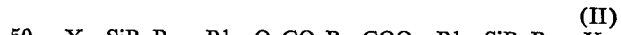

subjecting the product to mildly alkaline hydrolysis to give the corresponding disilanol in which the fluorine atoms X are replaced by hydroxyl groups; and finally polymerising the disilanol in the presence of a catalyst.

Alternative esterification processes to that described in the course of the preparation of the disilanol will be apparent to those skilled in the art.

The disilanol of formula II may be homopolymerised to yield a polyorganosiloxane gum having a repeating unit represented by the Formula I in which $n=0$. The selection of the catalyst present during the polymerisation of the disilanol is not part of the invention and the catalyst may be any of the recognised conventional catalysts for siloxane poly-condensations.

Advantageously in polyorganosiloxane gums of Formula I in which $n=0$, $R_C$ represents lower alkyl and $R_D$ is selected from the group consisting of lower alkyl, lower alkenyl, and single ring aryl groups, preferably $R_C$ is methyl and $R_D$ is predominantly methyl but may be replaced by up to 5 moles percent of vinyl or up to 20 moles percent of phenyl or both.

The disilanol of Formula II may be copolymerised with dihalosilanes preferably dichlorosilanes in appropriate proportions to yield polyorganosiloxane gums of Formula I in which $R_A$, $R_B$, $R_C$, $R_D$, $R^1$, and Py are as hereinbefore defined and $n$ is a positive integer from 1 to 6 inclusive.

Advantageously in such polyorganosiloxane gums $A_A$, $R_C$, and $R_D$ are lower alkyl and $R_B$ is selected from the group consisting of lower alkyl, lower alkenyl, and single ring aryl groups. $R_A$, $R_C$, and $R_D$ are preferably methyl and $R_B$ is predominantly methyl but may be replaced by vinyl or phenyl so that the polyorganosiloxane gum contains up to 5 moles percent of vinyl and up to 20 moles percent of phenyl or both. In the most preferred polyorganosiloxane gums vinyl constitutes about 2 moles percent and phenyl constitutes less than 10 moles percent. The constitution of the final polyorganosiloxane gum may be controlled by suitable selection of the dihalosilane for copolymerisation with the disilanol of Formula II and by selection of the proportions of reactants.

The co-polymerisation of the disilanol of Formula II with the dihalosilane is preferably carried out by heating the disilanol and the dihalosilane in the presence of an acid acceptor to absorb the hydrogen halide evolved from the condensation reaction.

A preferred heating range for both homopolymerisation and copolymerisation disclosed above is between about 130° and 165° C.

Although the above processes are described in terms of polymerisation of disilanols of Formula II or copolymerisation of such disilanols with dichlorosilanes, it will be readily seen by those skilled in the art that the polyorganosiloxane gums of the invention may be obtained by equivalent means, for example by reaction of modified disilanols of Formula II with such conventional disilanols as are not highly activated toward self-condensation. Structural changes in the modified polyorganosiloxane gums may also be achieved, for example, by equilibrating these modified polyorganosiloxanes with other polysiloxanes such as octamethylcyclotetrasiloxane, which will produce polyorganosiloxanes of Formula I in which $n=4$ or more, and $R_A=R_B=Me$.

Typical examples will now be described of a process for the production of modified polyorganosiloxanes in accordance with the invention which comprises repeating units having the structure:

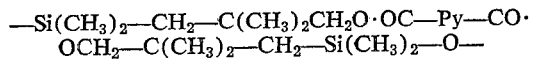

$$-Si(CH_3)_2-CH_2-C(CH_3)_2CH_2O\cdot OC-Py-CO\cdot OCH_2-C(CH_3)_2-CH_2-Si(CH_3)_2-O-$$

where Py is a meta-phenylene group or a para-phenylene group.

3-fluorodimethylsilyl-2,2-dimethylpropan-1-ol (2 mols) prepared as described in an article by E. J. P. Fear, J. Thrower and I. M. White in Chemistry and Industry, 1961, page 1877, is reacted in solution in benzene at 25°–30° C. for 1–2 hours with isophthaloyl chloride (1 mol) in the presence of a tertiary organic base (e.g. pyridine) (slightly in excess of 2 mols) to give good yields of bis - (3 - fluorodimethylsilyl - 2,2 - dimethylpropyl) isophthalate by a distillation process. This isophthalate is subjected to mildly hydrolysis in solution in acetone to give corresponding bis-(3-hydroxydimethylsilyl - 2,2 - dimethylpropyl) isophthalate. The acetone is immediately removed and the disilanol extracted.

The disilanol is carefully purified and is then polymerised by heating at between 130° C. and 165° C. (2–3 days) in the presence of potassium hydroxide, ferric chloride or tetramethylguanidine di-2-ethylhexanoates to give the desired modified polyorganisiloxane in the form of clear gums. These gums have inherent viscosities in 0.09% solution in toluene within the range 0.3 to 0.6 decilitres/gm. and are soluble in acetone, diethyl ether, toluene, benzene, cyclohexane, dioxane and tetrahydrofuran, but only slightly soluble in petroleum ether.

The polymer as formed may have carboxylic acid end groups and any resulting acidity of the polymer may be reduced by treatment with diazomethane in, for example, ether solution.

The polymer gum may also be subjected to a polymer precipitation process by dissolving it in dry acetone and precipitating it by the addition of methanol. A final product was obtained as a stiff gum by heat soaking at 140° C. under 0.1 torr pressure.

A typical modified silicone product having Py a metaphenylene group which was treated with diazomethane and the polymer precipitation process and having an acidity of 0.02 ml. 0.1 N NaOH per gm. had an inherent viscosity of 0.4 d.l./g. in 0.09% solution in toluene and started to decompose at approximately 250° C. in air and 360° C. in vacuo. Its glass transition temperature was −52° C. and its viscosity remained unchanged after three weeks exposure to the atmosphere.

The same sequence of reactions was carried out with the substitution of terephthaloyl chloride for isophthaloyl chloride and with the omission of the treatment with diazomethane. The final product was obtained as a very stiff gum by heat soaking at 120° C. under 0.1 torr pressure. The gum had an acidity of 0.50 ml. 0.1 N NaOH per gm. and had an inherent viscosity of 0.61 d.l./g. in 0.1% solution in toluene and started to decompose at 250° C. in air and 380° C. in vacuo. The glass transition temperature was −35.5° C. This material is a hard rubber at room temperature but fibres may be drawn from the melt at, for example, 140° C.

Material having modified properties with reference to the purely meta and para gums may be obtained by carrying out the above sequence of reactions with a mixture of isophthaloyl and terephthaloyl chlorides or alternatively pure meta and para gums may be compounded after production.

The modified silicones in which Py is a meta-phenylene or a para-phenylene group can both be vulcanised under conventional temperature and time conditions by heating under pressure with a peroxide cross-linking agent. Thus, for example, 100 parts by wt. of the product as described above in which Py is meta-phenylene was vulcanised by heating with 10 parts by wt. of dichlorobenzoyl peroxide for 20 minutes at 120° C. showing that the presence of the diester aromatic groups does not inhibit the vulcanisation action. A similar result was obtained when fine silica was incorporated in the product.

The markedly improved modulus of the modified polyorganosiloxanes in accordance with the invention is illustrated by the following results of a strain/stress test at 25° C. on the vulcanised modified silicone described above when unfilled and when filled with 18 parts of fine silica, and on a conventional methyl-vinyl silicone:

| Strain (extension ratio) | Stress (dynes/sq. cm.×10⁻⁶) | | |
|---|---|---|---|
| | Methyl-Vinyl Silicone | Unfilled Modified Silicone | Filled Modified Silicone |
| 1.2 | 0.6 | 1.0 | 1.6 |
| 1.4 | 1.0 | 1.8 | 2.6 |
| 1.6 | 1.3 | 2.4 | 3.6 |
| 1.8 | 1.5 | 2.8 | 4.6 |

The vulcanised modified silicones in accordance with the invention also have a solvent resistance to aircraft fuel which compares favourably with conventional silica filled methyl-silicones. Thus thin sheets of the vulcanised modified silicone products containing 18 parts by weight of fine silica which were immersed for two days at 25° C. to substantially equilibrium conditions, suffered a 133% volume increase in Avgas gasoline, 90% volume increase in Avtur kerosene, and a 7% volume increase in paraffin oil.

Continuous stress-relaxation measurements in a moist atmosphere on both filled and unfilled silicone specimens at 15° C. showed that the vulcanised product was very stable at this temperature and hence the modifying diester group was not liable to significant hydrolytic attack at temperatures of at least 150° C.

The modified silicone when filled with 40 parts of fine silica was found to have a tensile strength of 1380–1450 lbs./sq. in. with an elongation at break of 507 and a Durometer Shore A hardness of 50. For comparison, equivalent results for a typical general purpose methyl-vinyl silicone rubber at the same filler loading were a tensile strength of 821 lbs./sq. in., an elongation of 465, and a hardness of 55. It should be noted that whereas the established general purpose rubber had optimum cure, the cure conditions for the modified silicone may well have not been optimum. Nevertheless, an increase in strength of about 75% is shown with good extensibility and a hardness well within the range normal for silicone rubbers.

We claim:

1. A polyorganosiloxane gum consisting essentially of repeating units represented by the formula:

$$\text{\{SiR}_A\text{R}_B\text{—O\}}_n\text{SiR}_C\text{R}_D\text{—R}^1\text{—O—CO—Py—}$$
$$\text{CO—O—R}^1\text{—SiR}_C\text{R}_D\text{—O}$$

wherein $R_A$, $R_B$, $R_C$, and $R_D$ each represents lower alkyl, lower alkenyl, or single ring aryl; $R^1$ represents a divalent alkylene group having at least three carbon atoms; Py represents a divalent arylene group; and $n$ is a positive integer including 0.

2. A polyorganosiloxane gum as defined in claim 1 wherein Py represents a phenylene group; and $n$ is a positive integer from 0 to 6 inclusive.

3. A polyorganosiloxane gum as defined in claim 2 wherein $R_C$ is methyl; $R_D$ is methyl, vinyl or phenyl; $R^1$ represents a divalent alkylene group having three carbon atoms in which the carbon atom B to the ester oxygen atom carries two lower alkyl groups; and $n$ is 0.

4. A polyorganosiloxane gum as defined in claim 2 wherein $R_A$ and $R_C$ each represents methyl; $R_B$ and $R_D$ each represents methyl, vinyl or phenyl, and $R^1$ represents a divalent alkylene group having three carbon atoms in which the carbon atom B to the ester oxygen atom carries two lower alkyl groups.

5. A polyorganosiloxane gum as defined in claim 3 wherein $R_D$ is methyl but contains from 0 to 5 moles percent of vinyl and from 0 to 20 moles percent of phenyl; and $R^1$ represents —CH$_2$—C(methyl)$_2$—CH$_2$—.

6. The vulcanized product obtained by cross-linking the polyorganosiloxane gum of claim 3.

7. The vulcanized product obtained by cross-linking the polyorganosiloxane gum of claim 5.

8. A polyorganosiloxane gum as defined in claim 4 wherein $R_B$ and $R_D$ each represents methyl but contain from 0 to 5 moles percent vinyl and from 0 to 20 moles percent phenyl; and $R^1$ represents —CH$_2$—C(methyl)$_2$—CH$_2$—

9. The vulcanized product obtained by cross-linking the polyorganosiloxane gum of claim 4.

10. The vulcanized product obtained by cross-linking the polyorganosiloxane gum of claim 8.

11. A process for the production of a polyorganosiloxane gum comprising the steps of (1) reacting at ambient temperatures, in the presence of a tertiary organic base as a catalyst, a compound having the formula X—SiR$_C$R$_D$—R$^1$—OH wherein X is fluorine, $R_C$ and $R_D$ each represents lower alkyl, lower alkenyl, or single ring aryl; and $R^1$ represents a divalent alkylene group having at least three carbon atoms; with an acid halide Py(COZ)$_2$ in which Py represents a divalent arylene group and Z is halogen; (2) subjecting the product thereof to mildly alkaline hydrolysis to produce a disilanol having the formula:

HO—SiR$_C$R$_D$—R$^1$—O—CO—Py—
    CO—O—R$^1$—SiR$_C$R$_D$—OH and (3) polymerizing said disilanol in the presence of a siloxane polycondensation catalyst at about 130°–165° C.

12. A process according to claim 11 wherein step (3) comprises co-polymerizing the said disilanol with a compound of the formula X—SiR$_A$R$_B$—X in which $R_A$ and $R_B$ each represents lower alkyl, lower alkenyl, or single ring aryl; and X represents OH or halogen; said co-polymerization being carried out in the presence of a siloxane polycondensation catalyst.

References Cited

UNITED STATES PATENTS 3,347,824   10/1967   Washburn et al. _____ 260—46.5

DONALD E. CZAJA, Primary Examiner

M. I. MARQUIS, Assistant Examiner

U.S. Cl. X.R.

260—37, 75, 448.2, 448.8

PO-1050
(5/69)

UNITED STATES PATENT OFFICE
CERTIFICATE OF CORRECTION

Patent No. 3,525,709          Dated August 25, 1970

Inventor(s) Somerville et al

It is certified that error appears in the above-identified patent and that said Letters Patent are hereby corrected as shown below:

Column 3, line 6, delete "$A_A$" and insert -- $R_A$ -- ;

Column 3, line 60, after "mildly" insert -- alkaline -- .

Claim 3, line 4, delete the letter "B" and insert -- $\beta$ -- .

Claim 4, line 5, delete the letter "B" and insert -- $\beta$ -- .

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents